United States Patent
Sakai et al.

(10) Patent No.: US 6,539,922 B2
(45) Date of Patent: Apr. 1, 2003

(54) FUEL PRESSURE CONTROL APPARATUS AND METHOD OF INTERNAL COMBUSTION ENGINE

(75) Inventors: Mitsuto Sakai, Toyota (JP); Masanori Sugiyama, Aichi-gun (JP); Naoki Kurata, Nishikamo-gun (JP); Daichi Yamazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 22 days.

(21) Appl. No.: 09/825,847

(22) Filed: Apr. 5, 2001

(65) Prior Publication Data

US 2001/0027775 A1 Oct. 11, 2001

(30) Foreign Application Priority Data

Apr. 10, 2000 (JP) ......................... 2000-108156

(51) Int. Cl.⁷ .................... F02M 37/06; F02M 69/16
(52) U.S. Cl. ...................................... 123/458
(58) Field of Search ................. 123/457, 458, 123/497, 506, 511, 512

(56) References Cited

U.S. PATENT DOCUMENTS 5,483,940 A  * 1/1996 Namba et al. ............... 123/497

FOREIGN PATENT DOCUMENTS

| JP | 8-232703 A | | 9/1996 |
|---|---|---|---|
| JP | 10-299599 | * | 11/1998 |
| JP | 11-173230 | * | 6/1999 |

* cited by examiner

Primary Examiner—Tony M. Argenbright
(74) Attorney, Agent, or Firm—Oliff & Berridge PLC (57) ABSTRACT

The amount of fuel ejected from a high-pressure fuel pump that ejects fuel toward a delivery pipe is adjusted by controlling the valve closure start timing of an electromagnetic spill valve. In this manner, the fuel pressure in the delivery pipe is controlled. The duty ratio DT used for controlling the valve closure start timing of the electromagnetic spill valve is calculated based on a valve closure start timing that provides a maximum amount of fuel ejection. The actual fuel ejection characteristic of a high-pressure fuel pump may deviate from a designed state due to individual differences of the pump. However, the valve closure start timing of the electromagnetic spill valve that provides the maximum amount of fuel ejection in accordance with the actual fuel ejection characteristic is learned as a maximum ejection timing. Based on the maximum ejection timing, the duty ratio DT is calculated.

14 Claims, 5 Drawing Sheets

FUEL PRESSURE CONTROL APPARATUS AND METHOD OF INTERNAL COMBUSTION ENGINE

INCORPORATION BY REFERENCE

The disclosure of Japanese Patent Application No. 2000-108156 filed on Apr. 10, 2000 including the specification, drawings and abstract is incorporated herein by reference in its entirety.

BACKGROUND OF THE INVENTION

1. Field of Invention

The invention relates to a fuel pressure control apparatus and method of an internal combustion engine.

2. Description of Related Art

Generally, in a type of internal combustion engine that supplies fuel into a combustion chamber by directly injecting fuel into the chamber, a high-pressure fuel pump is provided for ejecting fuel toward a fuel delivery pipe. By adjusting the amount of fuel ejected from the high-pressure fuel pump through the control of the drive timing of the pump, the fuel pressure in the fuel delivery pipe (the pressure of fuel supplied to a fuel injection valve) is controlled. In this control of fuel pressure, the fuel pressure rises if the amount of fuel ejected from the high-pressure fuel pump is increased. If the amount of fuel ejected from the high-pressure fuel pump is reduced, the fuel pressure decreases.

A control amount used for controlling the drive timing of the high-pressure fuel pump is calculated such that an amount of fuel ejection requested of the pump can be achieved, based on the drive timing that provides a maximum amount of fuel ejection of the pump (maximum ejection timing). More specifically, the control amount is calculated based on a feed-forward term that is a value corresponding to the amount of fuel injected from the fuel injection valve, a proportional term that increases or decreases a deviation between the aforementioned fuel pressure and a target value of the fuel pressure so that the deviation becomes "0", and an integral term that is updated to an increased side or a reduced side in accordance with the aforementioned deviation.

By controlling the drive timing of the high-pressure fuel pump through the use of the control amount calculated as described above, a requested amount of fuel ejection can be obtained.

The amount of fuel ejected from the high-pressure fuel pump increases as the control amount increases and therefore the drive timing of the pump is advanced. Conversely, if the control amount decreases and therefore the drive timing of the pump is retarded, the amount of fuel ejected decreases. The upper limit value of the control amount is a value corresponding to the maximum ejection timing since the control amount is calculated based on the maximum ejection timing providing the maximum amount of fuel ejection. Thus, when the control amount reaches the value corresponding to the maximum ejection timing providing the maximum amount of fuel ejection, the amount of fuel ejected from the high-pressure fuel pump reaches a maximum value.

However, high-pressure fuel pumps vary in fuel ejection characteristic due to their individual differences. Therefore, even if the control amount remains the same, the amount of fuel ejection varies among individual pumps. It is conceivable to perform a learning operation so as to prevent the amount of fuel ejected from a high-pressure fuel pump from assuming a value excessively deviated from a proper value due to the aforementioned variations. Such a learning operation is used in a fuel pressure control apparatus described in, for example, Japanese Patent Application Laid-Open No. 8-232703.

In such a learning operation, the control amount is corrected by using a learned value that is a value corresponding to the deviation of the amount of fuel ejection from the proper value. The learned value is a value that is increased or decreased so as to converge the value of the integral term used for calculating the control amount into a predetermined range. That is, since the learned value is increased or decreased so as to converge the integral term into the predetermined range while the integral term is updated so as to prevent excessive increases of the deviation of the amount of fuel ejection from the proper value, the learned value is obtained as a value corresponding to the deviation of the amount of fuel ejection from the proper value. Therefore, by correcting the control amount through the use of the learned value, excessive deviations of the amount of fuel ejection from the proper value caused by the aforementioned variations are substantially suppressed.

The correction of the control amount by the learned value can suppress excessive deviations of the amount of fuel ejection of the high-pressure fuel pump from the proper value. In high-pressure fuel pumps, however, due to the individual variations in fuel ejection characteristic, the maximum ejection timing providing the maximum amount of fuel ejection also varies among individual pumps. Even if the maximum ejection timing providing the maximum amount of fuel ejection varies, the execution of the learning operation described in the aforementioned laid-open application does not change the drive timing providing the maximum amount of fuel ejection used for the calculation of the control amount. Therefore, if the control amount is set to a value (upper limit value) corresponding to the drive timing providing the maximum amount of fuel ejection, the maximum amount of fuel ejection is not achieved, so that it takes an added amount of time to raise the fuel pressure to a target value by setting the control amount to the upper limit value at the time of a start of the engine or the like.

SUMMARY OF THE INVENTION

Accordingly, it is an object of the invention to provide a fuel pressure control apparatus and method of an internal combustion engine that is capable of reliably achieving a theoretical or designed maximum amount of fuel ejection of a fuel pump.

A first aspect of the invention relates to a fuel pressure control apparatus of an internal combustion engine including a fuel pump for ejecting fuel toward a fuel delivery pipe, and a controller that adjusts an amount of fuel ejection of the fuel pump by controlling a drive timing of the fuel pump. The fuel pressure control apparatus controls the fuel pressure in the fuel delivery pipe. The controller calculates a control amount to be used for controlling the drive timing of the fuel pump, based on a maximum ejection timing that provides a maximum amount of fuel ejection of the fuel pump, and learns a drive timing of the fuel pump that provides the maximum amount of fuel ejection, as the maximum ejection timing.

According to the above-described aspect of the invention, it becomes possible to calculate a control amount that provides the maximum amount of fuel ejection by calculating the control amount based on a learned maximum ejection timing. Then, by controlling the drive timing of the fuel pump based on the control amount, the designed maximum amount of fuel ejection of the fuel pump can be achieved.

In the above-described aspect of the invention, the controller may calculate the control amount so that an amount of fuel ejection requested of the fuel pump is achieved, and may learn the maximum ejection timing based on values of the control amount provided under a plurality of engine operation states that differ in the amount of fuel ejection requested of the fuel pump.

According to this aspect of the invention, the actual fuel ejection characteristic of the fuel pump is estimated from the values of the control amount provided under the engine operation states that differ in the requested amount of fuel ejection. Then, the maximum ejection timing can be precisely learned from the estimated actual fuel ejection characteristic.

In the above-described aspect of the invention, the controller may calculate the control amount so that the amount of fuel ejection requested of the fuel pump is achieved, based on a deviation between a fuel pressure in the fuel delivery pipe and a target value of the fuel pressure.

According to this aspect of the invention, the control amount that provides the requested amount of fuel ejection can be precisely calculated. Therefore, the values of the control amount under the engine operation states that differ in the requested amount of fuel ejection become precise values. Hence, the actual fuel ejection characteristic of the fuel pump can be precisely estimated from the values of the control amount.

In the above-described aspect of the invention, the controller may learn the maximum ejection timing based on values of the control amount provided under a plurality of engine operation states that differ; in the amount of fuel ejection requested of the fuel pump at a fixed engine revolution speed.

The actual fuel ejection characteristic of the fuel pump changes depending on the engine revolution speed. According to the above-described aspect of the invention, the actual fuel ejection characteristic of the fuel pump can be precisely estimated from the values of the control amount provided under the engine operation states that differ in the requested amount of fuel ejection at the fixed engine revolution speed. If a maximum ejection timing is learned based on the thus-estimated actual fuel ejection characteristic, the learning can be more precisely performed.

In the above-described aspect of the invention, the controller may learn the maximum ejection timing for each of a plurality of learning regions that are divided in accordance with an engine revolution speed.

As the fuel ejection characteristic changes with changes in the engine revolution speed, the drive timing that provides the maximum amount of fuel ejection also changes. According to the above-described aspect, however, the maximum ejection timing is learned with respect to each of the learning regions divided in accordance with the engine revolution speed. Therefore, by learning control amounts based on the maximum ejection timings of the learning regions corresponding to engine revolution speeds, it becomes possible to precisely achieve the designed maximum amount of fuel ejection of the fuel pump regardless of the engine revolution speed.

BRIEF DESCRIPTION OF THE DRAWINGS

The foregoing and further objects, features and advantages of the invention will become apparent from the following description of a preferred embodiment with reference to the accompanying drawings, in which like numerals are used to represent like elements and wherein.

DETAILED DESCRIPTION OF PREFERRED EMBODIMENTS

A preferred embodiment in which the invention is applied to an automotive engine will be described hereinafter with reference to FIGS. 1 to 5.

Figure 2:
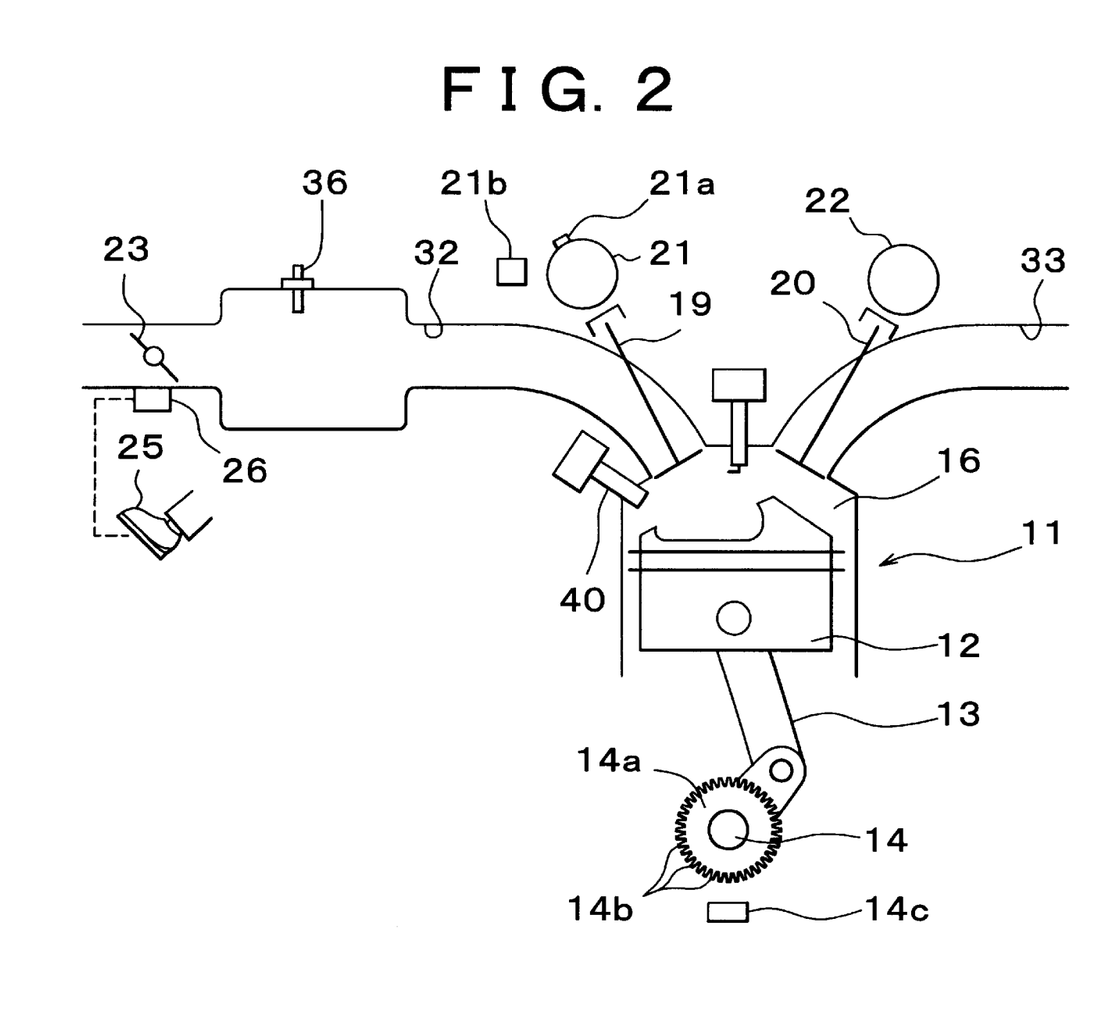
FIG. 2 is a schematic diagram illustrating the engine.

Referring FIG. 2, in an engine 11, a piston 12 is connected to a crankshaft 14 via a connecting rod 13. Reciprocating movements of the piston 12 are converted to rotation of the crankshaft 14 by the connecting rod 13. A signal rotor 14a having a plurality of protrusions 14b is attached to the crankshaft 14. Provided at a side of the signal rotor 14a is a crank position sensor 14c that outputs a pulsed signal corresponding to each protrusion 14b during rotation of the crankshaft 14.

An intake passage 32 and an exhaust passage 33 are connected to a combustion chamber 16 of the engine 11. The intake passage 32 and the combustion chamber 16, and the exhaust passage 33 and the combustion chamber 16 are interconnected and disconnected in communication by opening and closing an intake valve 19 and an exhaust valve 20, respectively. The intake valve 19 and the exhaust valve 20 are opened and closed by rotation of an intake camshaft 21 and an exhaust camshaft 22 to which rotation of the crankshaft 14 is transmitted. A cam position sensor 21b is provided at a side of the intake camshaft 21. The cam position sensor 21b outputs a detection signal every time one of protrusions 21a formed on the intake camshaft 21 passes by the cam position sensor 21b during rotation of the shaft 21.

A throttle valve 23 for adjusting the amount of air taken into the engine 11 is provided in an upstream portion of the intake passage 32. The degree of opening of the throttle valve 23 is adjusted in accordance with the operation of depressing an accelerator pedal 25 provided in a compartment of the motor vehicle. The amount of depression of the accelerator pedal 25 (accelerator depression amount) is detected by an accelerator position sensor 26. A vacuum sensor 36 for detecting the pressure in the intake passage 32 (intake air pressure) is provided in a portion of the intake passage 32 downstream of the throttle valve 23.

The engine 11 has a fuel injection valve 40 that directly injects fuel into the combustion chamber 16 to form a mixture of fuel and air. When the mixture in the combustion chamber 16 is burned, the piston 12 is reciprocated, and the crankshaft 14 is turned. The engine 11 is thus driven.

A structure of a fuel supplying apparatus of the engine 11 for supplying high-pressure fuel to fuel injection valves 40 will be described with reference to FIG. 1.

Figure 1:
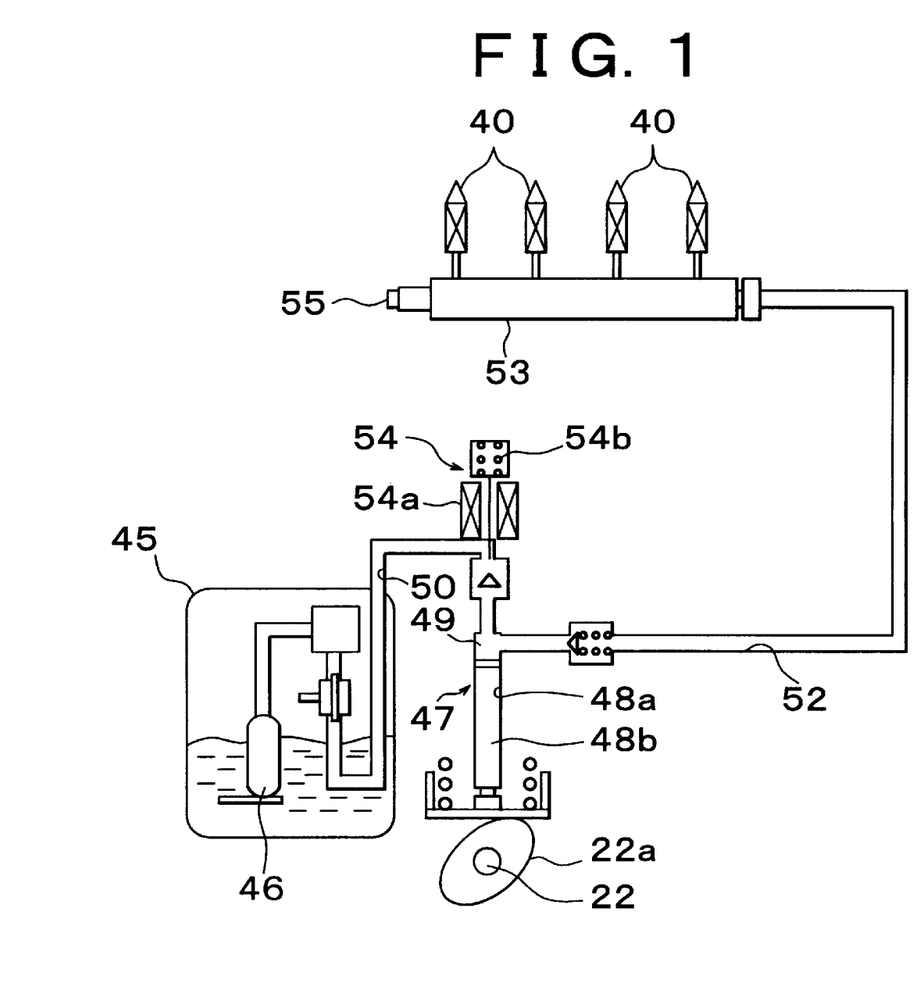
FIG. 1 is a schematic diagram illustrating a fuel supplying apparatus of an engine to which a fuel pressure control apparatus of a preferred embodiment of the invention is applied.

As shown in FIG. 1, the fuel supplying apparatus of the engine 11 has a feed pump 46 for pumping fuel out of a fuel tank 45, and a high-pressure fuel pump 47 for pressurizing fuel fed from the feed pump 46 and ejecting fuel toward the fuel injection valves 40.

The high-pressure fuel pump 47 has a plunger 48b that is reciprocated within a cylinder 48a based on rotation of a cam 22a mounted to the exhaust camshaft 22, and a pressurizing chamber 49 defined by the cylinder 48a and the plunger 48b. The pressurizing chamber 49 is connected to the feed pump 46 via a low-pressure fuel passage 50, and is connected to a delivery pipe 53 via a high-pressure fuel passage 52. The fuel injection valves 40 are connected to the delivery pipe 53. The delivery pipe 53 is provided with a fuel pressure sensor 55 for detecting the fuel pressure in the delivery pipe 53 (i.e., the pressure of fuel supplied to the fuel injection valves 40).

The high-pressure fuel pump 47 is provided with an electromagnetic spill valve 54 for connecting and disconnecting the low-pressure fuel passage 50 and the pressurizing chamber 49 with respect to each other. The electromagnetic spill valve 54 has an electromagnetic solenoid 54a. The electromagnetic spill valve 54 is opened and closed by controlling the voltage applied to the electromagnetic solenoid 54a.

When the electrification of the electromagnetic solenoid 54a is discontinued, the electromagnetic spill valve 54 is opened by the spring force of a coil spring 54b, so that the low-pressure fuel passage 50 and the pressurizing chamber 49 are placed in communication with each other. During this state, fuel pumped out by the feed pump 46 is drawn into the pressurizing chamber 49 via the low-pressure fuel passage 50 as the plunger 48b is moved in a direction so as to increase the capacity of the pressurizing chamber 49 (during a suction stroke).

When the plunger 48b is moved in a direction so as to decrease the capacity of the pressurizing chamber 49 (during a delivery stroke), the electromagnetic spill valve 54 is closed against the spring force of the coil spring 54b by electrifying the electromagnetic solenoid 54a. Thus, the low-pressure fuel passage 50 and the pressurizing chamber 49 are disconnected from communicating with each other, and fuel is ejected from the pressurizing chamber 49 into the high-pressure fuel passage 52 and the delivery pipe 53.

The amount of fuel ejected from the high-pressure fuel pump 47 is adjusted by adjusting the closed valve duration of the electromagnetic spill valve 54 during the delivery stroke through the control of the valve closure start timing of the spill valve 54. More specifically, the amount of fuel injected increases if the closed valve duration of the electromagnetic spill valve 54 is elongated by advancing the valve closure start timing of the valve 54. The amount of fuel ejected decreases if the closed valve duration of the electromagnetic spill valve 54 is shortened by retarding the valve closure start timing. By adjusting the amount of fuel ejected from the high-pressure fuel pump 47, the fuel pressure in the delivery pipe 53 is controlled.

Figure 3:
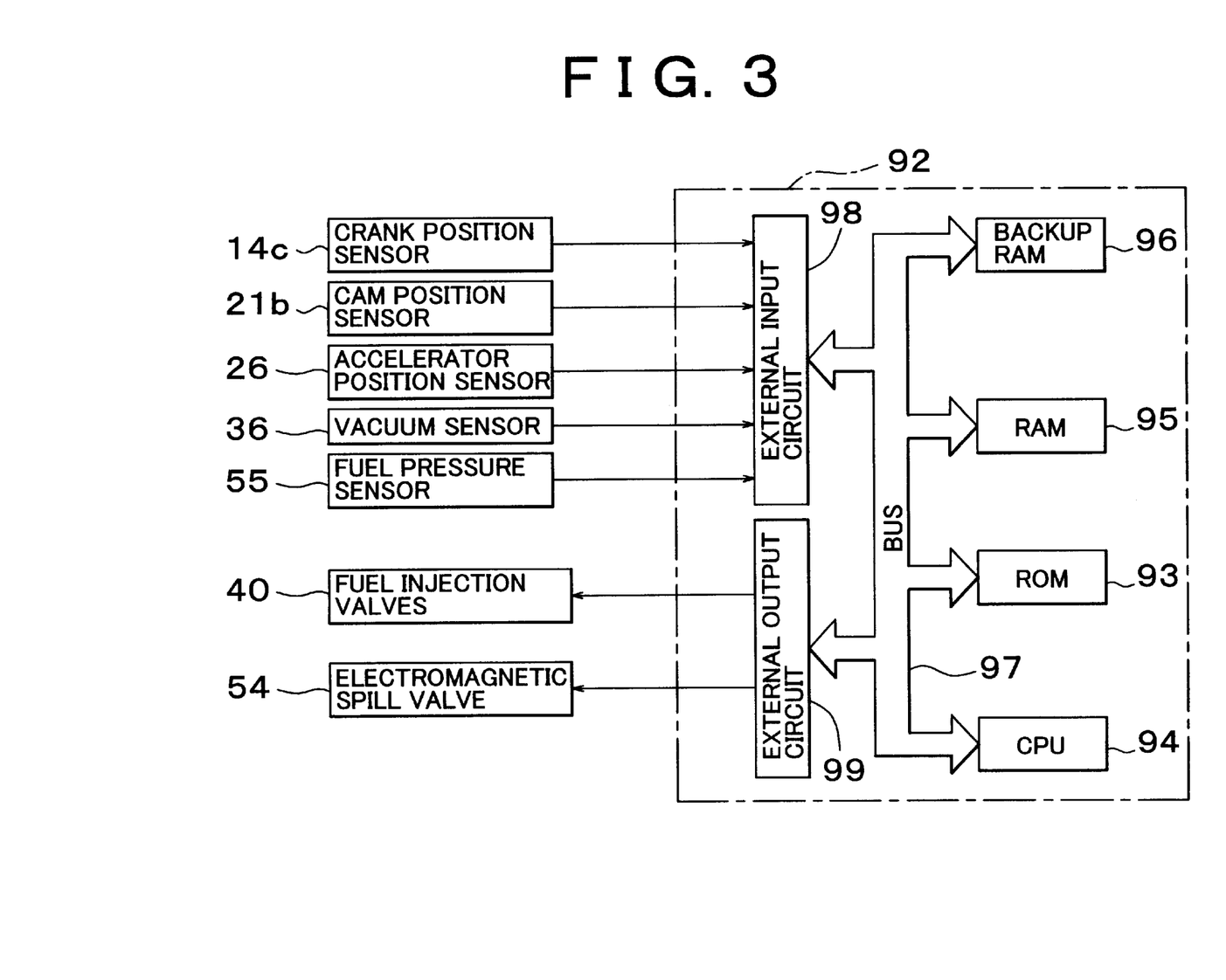
FIG. 3 is a block diagram illustrating an electrical construction of the fuel pressure control apparatus.

Next, an electrical construction of the fuel pressure control apparatus of this embodiment will be described with reference to FIG. 3.

The fuel pressure control apparatus has an electronic control unit (hereinafter, referred to as "ECU") 92 for controlling the state of operation of the engine 11. The ECU 92 is formed as an arithmetic logic circuit having a ROM 93, a CPU 94, a RAM 95, a backup RAM 96, etc.

The ROM 93 is a memory storing various control programs, maps that are referred to during execution of the various programs, etc. The CPU 94 executes processing operations based on the various programs and maps stored in the ROM 93. The RAM 95 is a memory for temporarily storing results of operations executed by the CPU 94, data input from various sensors, etc. The backup RAM 96 is a non-volatile memory that stores data and the like that need to be retained during a stoppage of the engine 11 (i.e., when the engine is turned off). The ROM 93, the CPU 94, the RAM 95 and the backup RAM 96 are interconnected and are connected to an external input circuit (interface) 98 and an external output circuit (interface) 99, via a bus 97.

The external input circuit 98 is connected to the crank position sensor 14c, the cam position sensor 21b, the accelerator position sensor 26, the vacuum sensor 36, the fuel pressure sensor 55, etc. The external output circuit 99 is connected to the fuel injection valves 40, the electromagnetic spill valve 54, etc.

The thus-constructed ECU 92 calculates a final amount of fuel injection Qfin that is used to control the amount of fuel injected from the fuel injection valves 40, based on an engine revolution speled NE, a load factor KL, etc. The engine revolution speed NE is determined based !on a detection signal from the crank position sensor 14c. The load factor KL is a value indicating the proportion of the present load to a maximum engine load of the engine 11. The load factor KL is calculated from the engine revolution speed NE and a parameter corresponding to the amount of air taken into the engine 11. Examples of the parameter corresponding to the amount of intake air include an intake air pressure PM determined based on a detection signal from the vacuum sensor 36, an amount of accelerator depression ACCP determined based on a detection signal from;: the accelerator position sensor 26, etc.

Based on the final amount of fuel injection Qfin calculated as described above, the ECU 92 drives and controls the fuel injection valves 40, and controls the amount of fuel injected from the fuel injection valves 40. The amount of fuel injected from the fuel injection valves 40 (amount of fuel injection) is determined by the fuel pressure in the delivery pipe 53 (fuel pressure) and the fuel injection duration. Therefore, in order to achieve a proper amount of fuel injection, it is necessary to keep the fuel pressure at a proper value. Hence, the ECU 92 keeps the fuel pressure P determined based on a detection signal from the fuel pressure sensor 55 at a proper pressure value by adjusting the amount of fuel ejected from the high-pressure fuel pump 47 so that the fuel pressure P becomes equal to a target fuel pressure P0 set in accordance with the engine operation state. The amount of fuel ejected from the high-pressure fuel pump 47 is adjusted by controlling the valve closure start timing of the electromagnetic spill valve 54 based on a duty ratio DT described below.

The aforementioned duty ratio DT is used for controlling the valve closure start timing (and thus the closed valve duration) of the electromagnetic spill valve 54 of the high-pressure fuel pump 47.

The duty ratio DT is a value that changes within the range of 0 to 100%, and that is related to the cam angle of the cam 22a corresponding to the closed valve duration of the electromagnetic spill valve 54. More specifically, if a cam angle corresponding to the maximum closed valve duration of the electromagnetic spill valve 54 (maximum cam angle) is represented by "θ0" and a cam angle corresponding to a target value of the closed valve duration of the electromagnetic spill valve 54 (target cam angle) is represented by "θ", the duty ratio DT is a value indicating the proportion of the target cam angle θ to the maximum cam angle θ0. Therefore, the duty ratio DT is set to a value closer to 100% as the targeted closed valve duration of the electromagnetic spill valve 54 becomes closer to the maximum closed valve duration. The duty ratio DT is set to a value closer to 0% as the targeted closed valve duration of the electromagnetic spill valve 54 becomes closer to "0".

As the duty ratio DT approaches 100%, the valve closure start timing of the electromagnetic spill valve 54 controlled based ion the duty ratio DT is advanced, and therefore the closed valve duration of the electromagnetic spill valve 54 increases. As a result, the amount of fuel ejected from the high-pressure fuel pump 47 increases, so that the fuel pressure P rises. As the duty ratio DT approaches 0%, the valve closure start timing of the electromagnetic spill valve 54 adjusted based on the duty ratio DT is retarded, and therefore the closed valve duration of the electromagnetic spill valve 54 decreases. As a result, the amount of fuel ejected from the high-pressure fuel pump 47 decreases, so that the fuel pressure P decreases.

Next, a procedure of calculating the duty ratio DT will be described with reference to the flowchart of FIG. 4, which illustrates a duty ratio calculating routine. The duty ratio calculating routine is executed at predetermined time intervals via the ECU 92.

In the duty ratio calculating routine, the duty ratio DT is calculated in step S104, based on expression (1) employing a feed-forward term FF, a proportional term DTp and an integral term DTi.

$$DT = FF + DTp + DTi \quad (1)$$

FF: feed-forward term
DTp: proportional term
DTi: integral term

In expression (1), the feed-forward term FF is a value corresponding to the amount of fuel ejection requested of the high-pressure fuel pump 47. The feed-forward term FF is provided for supplying the delivery pipe 53 with an amount of fuel that matches the amount of fuel injected from the fuel injection valves 40 beforehand, and for quickly bringing the fuel pressure P close to the target fuel pressure P0 even during an engine transitional state or the like. In step S101, the ECU 92 calculates the feed-forward term FF based on the engine operation state, such as the final amount of fuel injection Qfin, the engine revolution speed NE, etc. As the requested amount of fuel ejection (the amount of fuel injected from the fuel injection valves 40) increases, the feed-forward term FF assumes a greater value, and changes the duty ratio DT toward 100%, that is, toward a side such that the valve closure start timing of the electromagnetic spill valve 54 is advanced.

Furthermore, in expression (1), the proportional term DTp is a value that is increased or decreased so as to bring a deviation between the fuel pressure P and the target fuel pressure P0 to "0". In step S102, the ECU 92 calculates the proportional term DTp as in expression (2) based on the actual fuel pressure P and the pre-set target fuel pressure P0.

$$DTp = K1 \cdot (P0 - P) \quad (2)$$

K1: coefficient
P: actual fuel pressure
P0: target fuel pressure

It should be understood from expression (2) that, if the actual fuel pressure P is smaller than the target fuel pressure P0, increases of the value of the difference therebetween ("P0–P") increase the value of the proportional term DTp, so that the duty ratio DT is changed toward 100%, that is, toward a side such that the valve closure start timing of the electromagnetic spill valve 54 is advanced. Conversely, if the actual fuel pressure P becomes greater than the target fuel pressure P0, decreases of the value of the difference therebetween ("P0–P") decrease the value of the proportional term DTp, so that the duty ratio DT is changed toward 0%, that is, toward a side such that the valve closure start timing of the electromagnetic spill valve 54 is retarded.

Furthermore, in expression (1), the integral term DTi is a value that is updated to an increased side or a decreased side in accordance with the deviation between the fuel pressure P and the target fuel pressure P0. The integral term DTi serves to reduce the variation in the amount of fuel injection caused by fuel leakage or individual differences of the high-pressure fuel pump 47. In step S103, the ECU 92 calculates a latest integral term DTi as in expression (3) based on the previous integral term DTi, the actual fuel pressure P, the target fuel pressure P0, etc.

$$DTi = DTi + K2 \cdot (P0 - P) \quad (3)$$

K2: coefficient
P: actual fuel pressure
P0: target fuel pressure

As is apparent from expression (3), when the actual fuel pressure P is smaller than the target fuel pressure P0, a value corresponding to the difference therebetween ("P0–P") is added to the integral term DTi. As a result, the integral term DTi is gradually updated to greater values, and therefore the duty ratio DT is gradually changed toward 100%. Conversely, when the fuel pressure P is greater than the target fuel pressure P0, a value corresponding to the difference therebetween ("P0–P") is subtracted from the integral term DTi. As a result, the integral term DTi is gradually updated to smaller values, and therefore the duty ratio DT is gradually changed toward 0%.

Based on the duty ratio DT calculated as in expression (1) and the detection signals from the crank position sensor 14c and the cam position sensor 21b, the ECU 92 controls the timing of starting to electrify the electromagnetic solenoid 54a of the electromagnetic spill valve 54, that is, the valve closure start timing of the electromagnetic spill valve 54. By controlling the valve closure start timing of the electromagnetic spill valve 54, the closed valve duration of the electromagnetic spill valve 54 is changed to adjust the amount of fuel ejected from the high-pressure fuel pump 47 so that the fuel pressure P is changed toward the target fuel pressure P0.

Figure 5:
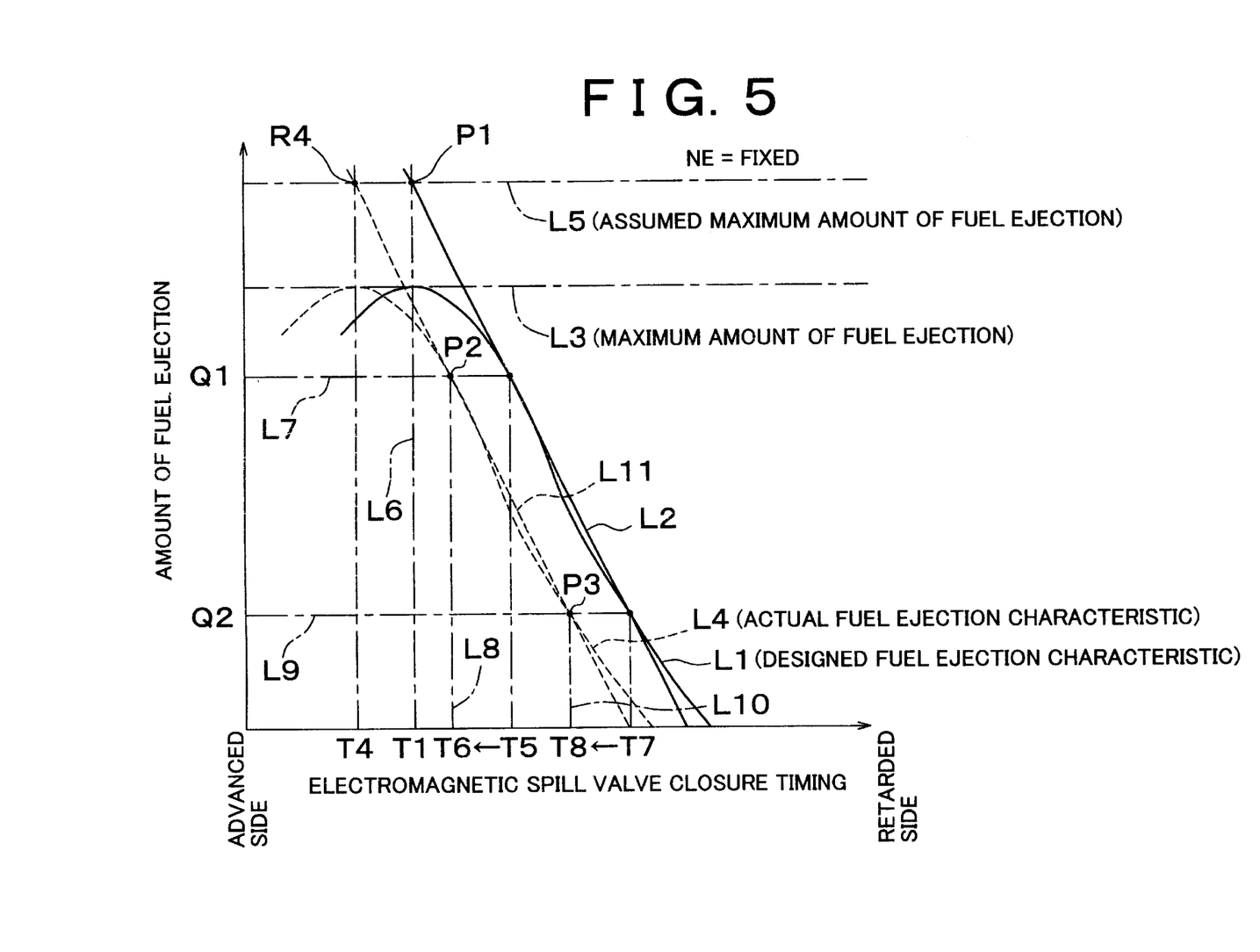
FIG. 5 is a graph for illustrating a procedure of learning a maximum ejection timing.

The fuel ejection characteristic of the high-pressure fuel pump 47 now will be described. FIG. 5 is a diagram indicating the tendency of transition of the amount of fuel ejected from the high-pressure fuel pump 47 in a case where the valve closure start timing of the electromagnetic spill valve 54 (duty ratio DT) is changed under a condition that the engine revolution speed NE is fixed.

As indicated by a solid line L1, the amount of fuel ejected from the high-pressure fuel pump 47 increases with advancement of the valve closure start timing of the electromagnetic spill valve 54. The amount of fuel ejected becomes maximum when the valve closure start timing of the electromagnetic spill valve 54 is a timing T1. Therefore, setting is made such that the valve closure start timing of the electromagnetic spill valve 54 at a duty ratio DT of 100% is set to the timing T1. When the amount of fuel ejection requested of the high-pressure fuel pump 47 is maximum, the duty ratio DT is calculated so that the duty ratio DT becomes 100%. When the requested amount of fuel ejection is less than the maximum value, the duty ratio DT is calculated so that the duty ratio DT becomes a predetermined value that is less than 100%, in accordance with the requested amount of fuel ejection. Thus, the duty ratio DT is calculated so that the requested amount of fuel ejection is achieved, based on the valve closure start timing (timing T1) providing the maximum amount of fuel ejection.

The fuel ejection characteristic (solid line L1) of the high-pressure fuel pump 47 changes in accordance with the engine revolution speed NE. That is, as the engine revolution speed NE changes, the gradient of the solid line L1 indicating the transition of the amount of fuel ejection with respect to changes in the valve closure start timing of the electromagnetic spill valve 54, that is, the slope angle of a solid line L2 indicating the aforementioned gradient, changes. Furthermore, as the engine revolution speed NE changes, a one-dot chair line L3 indicating the maximum amount of fuel ejection of the high-pressure fuel pump 47 shifts upward or downward in FIG. 5, and the position of the timing T1 corresponding to the valve closure start timing of the electromagnetic spill valve 54 providing the maximum amount of fuel ejection shifts to the right or left in FIG. 5.

In theory, the fuel ejection characteristic of the high-pressure fuel pump 47 is supposed to be as indicated by the solid line L1. In reality, however, the high-pressure fuel pump 47 may have a fuel ejection characteristic as indicated by a broken line L4. If, in such a case, the duty ratio DT is set to 100% (upper limit value) to set the valve closure start timing of the electromagnetic spill valve 54 to the timing T1, the maximum amount of fuel ejection indicated by the one-dot chain line L3 cannot be achieved. In that case, therefore, since the maximum amount of fuel ejection cannot be achieved, it requires an added amount of time to raise the fuel pressure P to a target fuel pressure P0 by setting the duty ratio DT to 100% in a case where the actual fuel pressure P is much smaller than the target fuel pressure P0, for example, at the time of a start of the engine or the like.

Figure 4:
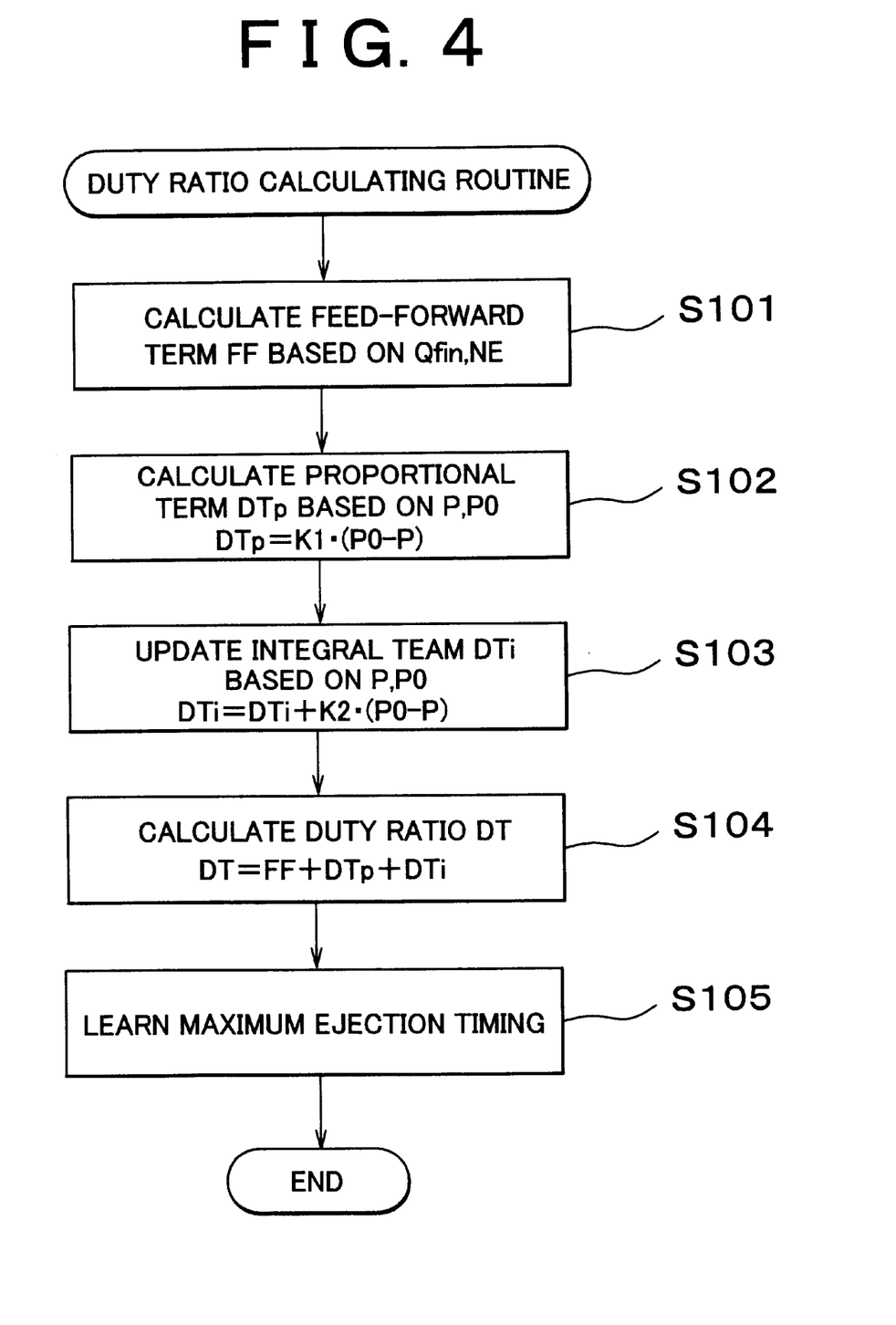
FIG. 4 is a flowchart illustrating a procedure of calculating a duty ratio DT.

In this embodiment, therefore, a timing T4 that provides an actual maximum amount of fuel ejection is learned as a maximum ejection timing through the process of step S105 in the duty ratio calculating routine illustrated in FIG. 4. Then, the valve closure start timing of the electromagnetic spill valve 54 set at the time of the duty ratio DT being 100% is reset to the timing T4 (maximum ejection timing) instead of the timing T1. As a result, the duty ratio DT is calculated based on the learned maximum ejection timing (timing T4) such that the requested amount of fuel ejection can be achieved. Therefore, if the duty ratio DT is set to 100% (upper limit value) at the time of a start of the engine or the like, the valve closure start timing of the electromagnetic spill valve 54 is set to, the timing T4, so that the maximum amount of fuel ejection indicated by the one-dot chain line L3 can be achieved.

Thus, by calculating the duty ratio DT based on the learned maximum ejection timing (timing T4), it becomes possible to calculate the duty ratio DT in a manner that achieves the maximum amount of fuel ejection. Therefore, at the time of a start of the engine or the like, the amount of fuel ejected from the high-pressure fuel pump 47 is maximized by setting the duty ratio DT to 100%, so that the actual fuel pressure P can be quickly brought close to the target fuel pressure P0. The above-described learning of the maximum ejection timing is performed with respect to each one of a plurality of learning regions that are divided, for example, in accordance with the engine revolution speed NE. The thus-learned maximum ejection timing for each learning region is stored in a predetermined area of the backup RAM 96. Then, the calculation of the duty ratio DT is performed based on the maximum ejection timing for a learning region corresponding to the actual engine revolution speed NE.

Next, a maximum ejection timing learning procedure executed in the process of step S105 will be described in detail.

As indicated in FIG. 5, the theoretical or designed fuel ejection characteristic of the high-pressure fuel pump 47 becomes, for example, as indicated by the solid line L1, provided that the engine revolution speed NE is a predetermined value. If, with this characteristic maintained, the amount of fuel ejection requested of the high-pressure fuel pump 47 is, for example, a pre&determined value Q1, the duty ratio DT becomes such a value that the valve closure start timing of the electromagnetic spill valve 54 is set to a timing T5. However, if the actual fuel ejection characteristic of the high-pressure fuel pump 47 is, for example, as indicated by a broken line L4, due to individual differences of the high-pressure fuel pump 47 or the like, the valve closure start of the electromagnetic spill valve 54 at the timing T5 will only provide an amount of fuel ejection that is less than the requested value (predetermined value Q1).

In this case, the actual fuel pressure P is lower than the target fuel pressure P0, so that the proportional term DTp and the integral term DTi increase. Therefore, the duty ratio DT calculated from these terms changes toward 100%. As a result, the valve closure start timing of the electromagnetic spill valve 54 shifts from the timing T5 to the timing T6, so that the amount of fuel ejection reaches the predetermined value Q1. The ECU 92 stores into the RAM 95 the amount (predetermined value Q1) of fuel ejected from the high-pressure fuel pump 47 during the aforementioned state, and stores into the RAM 95 the duty ratio DT that sets the valve closure start timing of the electromagnetic spill valve 54 to the timing T6. The predetermined value Q1 is calculated based on the then final amount of fuel injection Qfin, since the requested amount of fuel ejection changes in accordance with the amount of fuel injected from the fuel injection valves 40. That is, assuming that fuel injection is performed twice for each action of fuel ejection from the high-pressure fuel pump 47, a value obtained by doubling the final amount of fuel injection Qfin is calculated as the predetermined value Q1.

Furthermore, if the amount of fuel ejection requested of the high-pressure fuel pump 47 is a predetermined value Q2 different from the predetermined value Q1 under a condition that the engine revolution speed NE is the aforementioned predetermined value, the duty ratio DT is originally provided with a value that sets the valve closure start timing of the electromagnetic spill valve 54 to a timing T7. However, since the actual fuel ejection characteristic of the high-pressure fuel pump 47 is a characteristic as indicated by the broken line L4 due to individual differences of the high-pressure fuel pump 47, the actual duty ratio DT is changed toward 100% so as to achieve the requested amount of fuel ejection (predetermined value Q2). As a result, the valve closure start timing of the electromagnetic spill valve 54 changes from the timing T7 to the timing T8. The ECU 92 stores into the RAM 95 the amount (predetermined value Q2) of fuel ejected from the high-pressure fuel pump 47 during the aforementioned state, and stores into the RAM 95 the duty ratio DT that sets the valve closure start timing of the electromagnetic spill valve 54 to the timing T8.

The ECU 92 estimates an actual fuel ejection characteristic (broken line L4) of the high-pressure fuel pump 47 based on the duty ratio DT stored in the RAM 95 as a duty ratio for achieving the predetermined value Q1, and the duty ratio DT stored in the RAM 95 as a duty ratio for achieving the predetermined value Q2. The duty ratios DT used to estimate a fuel ejection characteristic are duty ratios stored at the time of engine operation states where the requested amount of fuel ejection becomes equal to the predetermined values Q1 and Q2, which values are different from each other.

In order to estimate an actual fuel ejection characteristic, the ECU 92 first determines a point P2 indicated in FIG. 5, based on the predetermined value Q1 and the timing T6 corresponding to the duty ratio DT for achieving the predetermined value Q1. The point P2 is the intersection of a one dot chain line L7 indicating the predetermined value Q1 and a one-dot chain line L8 indicating the timing T6 in FIG. 5. Subsequently, the ECU 92 determines a point P3 in FIG. 5, based on the predetermined value Q2 and the timing T8 corresponding to the duty ratio DT for achieving the predetermined value Q2. The point P3 is the intersection of a one-dot chain line L9 indicating the predetermined value Q2 and a one-dot chain line L10 indicating the timing T8 in FIG. 5. Based on the points P2 and P3 determined as described above, the ECU 92 determines a broken line L11 that is a straight line connecting the points P2 and P3. From the broken line L11, the ECU 92 estimates an actual fuel ejection characteristic (broken line L4) of the high-pressure fuel pump 47.

After that, based on the estimated actual fuel ejection characteristic, the ECU 92 determines a valve closure start timing of the electromagnetic spill valve 54 (timing T4) that provides the maximum amount of fuel ejection. More specifically, the ECU 92 first determines an assumed maximum amount of fuel ejection indicated by a one-dot chain line L5 in FIG. 5, based on the engine revolution speed NE, which is the aforementioned predetermined value. The assumed maximum amount of fuel ejection is an amount of fuel ejection corresponding to a point P1 of intersection of the solid line L2 indicating the gradient of the solid line L1 and a one-dot chain line L6 indicating the timing T1. Since the slope angle of the solid line L2 and the position of the timing T1(one-dot line L6) in the right-and-left direction in FIG. 5 change in accordance with the engine revolution speed NE as mentioned above, the position of the assumed maximum amount of fuel ejection-indicating one-dot chain line L5 in the up-and-down direction in FIG. 5 is determined in accordance with the engine revolution speed NE. Therefore, it is possible to determine an assumed maximum amount of fuel ejection based on the engine revolution speed NE, with reference to a pre-set map and the like.

Subsequently, the ECU 92 determines a point P4 of intersection of the one-dot chain line L5 indicating the assumed maximum amount of fuel ejection and the broken line L11 indicating the gradient of the actual fuel ejection characteristic curve (broken line L4). The timing T4 corresponding to the point P4 is a valve closure start timing of the electromagnetic spill valve 54 that provides the maximum amount of fuel ejection in accordance with the actual fuel ejection characteristic. In this manner, the valve closure start timing (timing T4) of the electromagnetic spill valve 54 that provides the maximum amount of fuel ejection is determined based on the estimated actual fuel ejection characteristic (broken line L4). Then, the ECU 92 learns the timing T4 as a maximum ejection timing cam angle θ0 of a learning region corresponding to the present engine revolution speed NE. From this time on, the ECU 92 sets the valve closure start timing of the electromagnetic spill valve 54 corresponding to the duty ratio DT of 100% to the timing T4 (maximum ejection timing) when the engine revolution speed NE is within the aforementioned learning region.

The above-described embodiment achieves the following advantages.

Even if the fuel ejection characteristic of the high-pressure fuel pump 47 deviates from the theoretical or designed state (solid line L1) due to individual differences of the pump, the valve closure start timing (timing T4) of the electromagnetic spill valve 54 providing the maximum ejection timing in accordance with the actual fuel ejection characteristic (broken line L4) is learned as a maximum ejection timing. Then, setting is made such that when the duty ratio DT is set to 100%, the valve closure start timing of the electromagnetic spill valve 54 becomes the thus-learned maximum ejection timing (timing T4). Therefore, the duty ratio DT is calculated based on the maximum ejection timing, so that the maximum amount of fuel ejection is achieved when the duty ratio DT is set to 100%. Since it becomes possible to calculate the duty ratio DT so as to achieve the maximum amount of fuel ejection, the amount of fuel ejection can be brought to the maximum amount by setting the duty ratio DT to 100% so as to quickly raise the actual fuel pressure P to the target fuel pressure P0 even when the actual fuel pressure P is excessively lower than the target fuel pressure P0, for example, at the time of a start of the engine.

The broken line L11 shown in FIG. 5 is determined based on the values of the duty ratio DT and the values (predetermined values Q1, Q2) of the requested amount of fuel ejection provided under a plurality of engine operation states that differ in the requested amount of fuel ejection, (amount of fuel injected from the fuel injection valves 40) at a fixed engine revolution speed NE. The broken line L11 indicates the gradient of the actual fuel ejection characteristic line (broken line L4). By determining the broken line L11 as described above, the actual fuel ejection characteristic can be precisely estimated. Since a maximum ejection timing is learned through the use of the broken line L11 corresponding to the estimated actual fuel ejection characteristic line (broken line L4), the learning can be precisely performed.

The duty ratio DT is precisely calculated so as to achieve the requested amount of fuel ejection, based on the deviation between the actual fuel pressure P and the target fuel pressure P0. Therefore, when values of the duty ratio DT under a plurality of engine operation states are calculated, the calculation can be precisely performed. Hence, based on the thus-calculated duty ratios DT, the broken line L4 can be precisely determined. As a result, an actual fuel ejection characteristic (broken line L4) estimated by determining the broken line L4 is a precisely estimated characteristic.

The learning of a maximum ejection timing is performed for each one of the learning regions divided in accordance with the engine revolution speed NE. Therefore, by calculating the duty ratio DT based on the maximum ejection timing of a learning region corresponding to an engine revolution speed NE, it becomes possible to provide the maximum amount of fuel ejection regardless of the engine revolution speed NE.

The embodiment may be modified, for example, in the following manner.

Although in the embodiment, the learning of a maximum ejection timing is performed for each of the learning regions divided in accordance with the engine revolution speed NE, it is not essential to perform the learning for all the learning regions. For example, it is possible to perform the maximum ejection timing learning only with respect to low-speed regions and omit the learning with respect to high-speed regions. According to this modification, when the engine revolution speed NE is in a low-speed region, for example, at the time of a start of the engine or the like, the learning is performed, and therefore the fuel pressure P can be quickly raised to the target fuel pressure P0.

In the illustrated embodiment, the controller (ECU 92) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). ThIe controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel pressure control apparatus of an internal combustion engine, comprising:
   a fuel pump that ejects fuel toward a fuel delivery pipe; and
   a controller that adjusts an amount of fuel ejection of the fuel pump by controlling a drive timing of the fuel pump, wherein the controller:
   calculates a control amount to be used for controlling the drive timing of the fuel pump, based on a maximum ejection timing that provides a maximum amount of fuel ejection of the fuel pump; and
   learns a drive timing of the fuel pump that provides the maximum amount of fuel ejection, as the maximum ejection timing.

2. A fuel pressure control apparatus according to claim 1, wherein the controller:
   calculates the control amount so that an amount of fuel ejection requested of the fuel pump is achieved, and
   learns the maximum ejection timing based on values of the control amount provided under a plurality of engine operation states that differ in the amount of fuel ejection requested of the fuel pump.

3. A fuel pressure control apparatus according to claim 2, wherein the controller calculates the control amount so that then amount of fuel ejection requested of the fuel pump is achieved, based on a deviation between a fuel pressure in the fuel delivery pipe and a target value of the fuel pressure.

4. A fuel pressure control apparatus according to claim 2, wherein the controller learns the maximum ejection timing based on values of the control amount provided under a plurality of engine operation states that differ in the amount of fuel ejection requested of the fuel pump at a fixed engine revolution speed.

5. A fuel pressure control apparatus according to claim 1, wherein the controller learns the maximum ejection timing for each of a plurality of learning regions that are divided in accordance with an engine revolution speed.

6. A fuel pressure control apparatus according to claim 1, wherein the control amount controls a closed valve duration of a spill valve of the fuel pump.

7. A fuel pressure control apparatus according to claim 6, wherein the control amount is a valve closure start timing of the spill valve.

8. A fuel pressure control method for an internal combustion engine having a fuel pump that ejects fuel toward a fuel delivery pipe, comprising:
   learning a drive timing of the fuel pump that provides a maximum amount of fuel ejection, as a maximum ejection timing;
   calculating a control amount to be used for controlling the drive timing of the fuel pump based on the maximum ejection timing; and
   adjusting the amount of fuel ejection of the fuel pump by controlling the drive timing of the fuel pump based upon the calculated control amount.

9. A fuel pressure control method according to claim 8, wherein:
   the calculating step calculates the control amount so that an amount of fuel ejection requested of the fuel pump is achieved, and
   the learning step learns the maximum ejection timing based on values of the control amount provided under a plurality of engine operation states that differ in the amount of fuel ejection requested of the fuel pump.

10. A fuel pressure control apparatus according to claim 9, wherein the calculating step calculates the control amount so that the amount of fuel ejection requested of the fuel pump is achieved, based on a deviation between a fuel pressure in the fuel delivery pipe and a target value of the fuel pressure.

11. A fuel pressure control method according to claim 9, wherein the learning step learns the maximum ejection timing based on values of the control amount provided under a plurality of engine operation states that differ in the amount of fuel ejection requested of the fuel pump at a fixed engine revolution speed.

12. A fuel pressure control method according to claim 8, wherein the learning step learns the maximum ejection timing: for each of a plurality of learning regions that are divided in accordance with an engine revolution speed.

13. A fuel pressure control method according to claim 8, wherein the control amount controls a closed valve duration of a spill valve of the fuel pump.

14. A fuel pressure control method according to claim 13, wherein the control amount is a valve closure start timing of the spill valve.

* * * * *